H. H. FRICK.
ARCH CENTERING.
APPLICATION FILED MAR. 24, 1917.
1,249,611.
Patented Dec. 11, 1917.
2 SHEETS—SHEET 2.
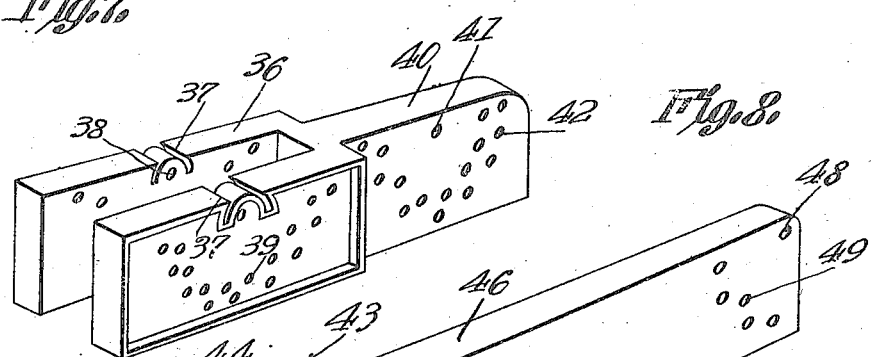
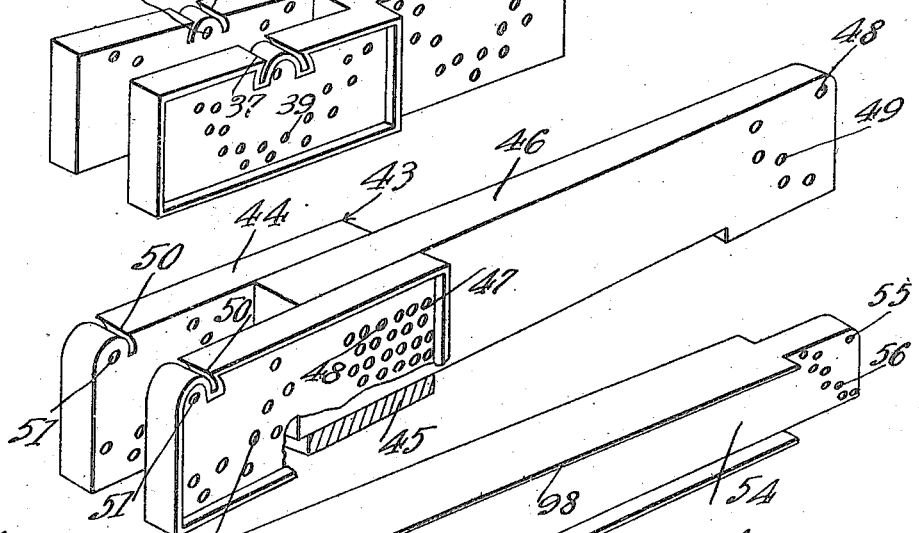
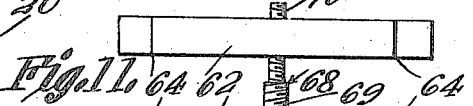
Witness
Inventor
H. H. Frick
By C. A. Snow & Co.
Attorney

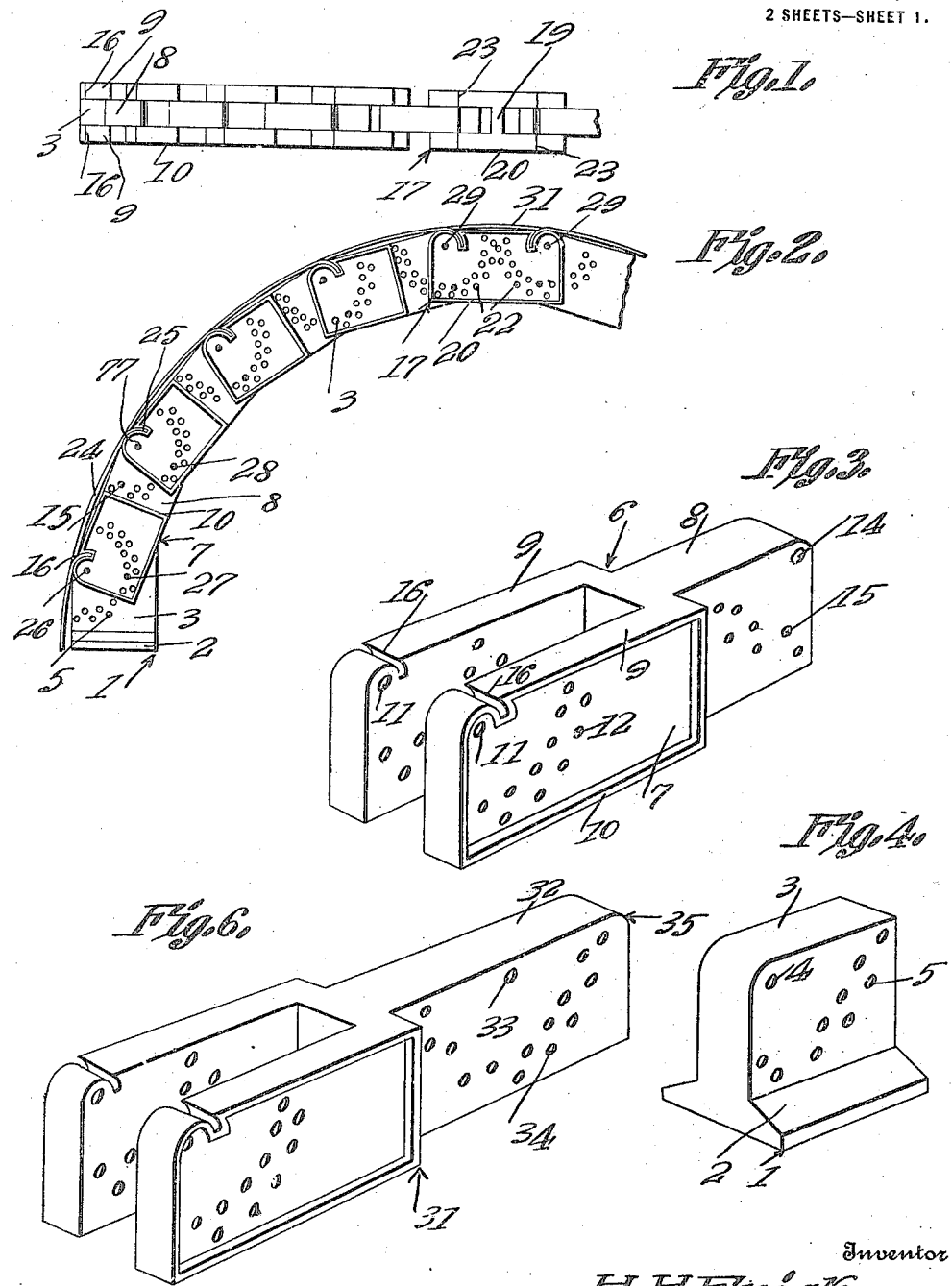

UNITED STATES PATENT OFFICE.

HENRY H. FRICK, OF FRICKS, PENNSYLVANIA.

ARCH-CENTERING.

1,249,611.  Specification of Letters Patent.  Patented Dec. 11, 1917.

Application filed March 24, 1917. Serial No. 157,185.

*To all whom it may concern:*

Be it known that I, HENRY H. FRICK, a citizen of the United States, residing at Fricks, in the county of Bucks and State of Pennsylvania, have invented a new and useful Arch-Centering, of which the following is a specification.

The device constituting the subject matter of this application is a form adapted to be used for making culverts and other structures, and the invention aims to provide novel means whereby a proper adjustment between the parts of the form may be effected, novel means being provided whereby the form is adapted to receive a lagging.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in top plan, an arch form constructed in accordance with the present invention, parts being broken away;

Fig. 2 is a side elevation of the structure shown in Fig. 1;

Fig. 3 is a perspective view showing one of the voussoirs;

Fig. 4 is a perspective view showing one of the skewbacks;

Fig. 5 is a perspective view showing the keystone;

Figs. 6, 7, 8, and 9 are perspective views showing modified forms of voussoirs;

Fig. 10 is a side elevation showing a modified keystone; and

Fig. 11 is a top plan of the structure shown in Fig. 10.

In carrying out the invention as delineated in Figs. 1 to 5 both inclusive, there is provided, as outlined in Fig. 4, a skewback 1 including a base 2 and a body 3 provided adjacent its outer corner with a pivot aperture 4 and supplied with openings 5 located in arcs, the center of which is the pivot aperture 4.

One of the voussoirs is shown in Fig. 3 and is denoted generally by the numeral 6, the voussoir including a body 7 and a thinned end 8, the body 7 including spaced arms 9 provided with reinforcing flanges 10. The constituent arms 9 of the body 7 are provided with pivot apertures 11, the arms being supplied with openings 12 located in arcs the center of which is the aperture 11. The thinned end 8 of the voussoir 6 has a pivot aperture 14 and is provided with openings 15 located in arcs the center of which is the aperture 14. Near to the pivot apertures 11, and in their upper edges, the arms 9 are supplied with curvilinear notches 16, the center of curvature of which is the pivot aperture 11.

The numeral 17 denotes, as shown in Fig. 5, a keystone comprising parallel walls 18 and a web 19 connecting the walls intermediate their ends, the walls 18 of the keystone being reinforced by flanges 20 corresponding to the flanges 10. The walls 18 of the keystone are supplied adjacent their upper edges and near to their ends with pivot apertures 21, and in the walls 18 are formed openings 22 located on arcs struck with the apertures 21 as centers. In their upper edges and at their ends, the walls 18 are supplied with curved notches 23, the centers of curvature of which are the apertures 21.

The body 3 of the skewback 1 is placed between the arms 9 of the voussoir 6, and a pivot element 26 is extended through the openings 11 and 4. A securing pin 27 is passed through selected openings 12 and 5 in the voussoir and in the skewback respectively. The end 8 of the lowermost voussoir is placed between the arm 9 of the next upper voussoir. A pivot element 77 is extended through the openings 14 and 11 of the respective voussoirs, and the voussoirs are united by a pin 28 placed in the openings 15 and 12 of the voussoirs. This operation is continued, the voussoirs being duplicated to any desired extent, until the keystone 17 is reached. Then, the end 8 of the uppermost voussoir is received between the walls 8 of the keystone, a pivot element 29 is placed in the openings 21 and 14, and the end 8 of the uppermost voussoir is connected with the walls 18 of the keystone by a pin 30, extended through the openings 22 and 15. It is to be understood that the pins and pivot elements may be of any desired construction.

On top of the arch constructed as above described is placed a lagging which may consist of overlapped cover plates 24 preferably made of metal, each cover plate having a flange 25, the flanges of the cover plates being received in the notches 16 and 23. On top of the keystone 17 may be placed a supplemental cover plate 31.

Owing to the fact that the various parts of the form above described are provided with such opening as those shown at 12, 15, 5 and 22, an almost endless number of combinations may be made, rendering it possible to adjust the size of the form. Since the various parts of the arch are provided with notches, of which the notches 16 may be taken as typical, a means is provided whereby the cover plates 24 which form the lagging may be held in place, even though the radius or curvature of the arch be changed.

The voussoir or unit may be altered depending upon the character of the work in hand. For instance, if a bonding unit is required, that is, if the form is to be placed around the outside of a mold, instead of underneath, in arch form, as shown in Fig. 2, then the voussoir 31 of Fig. 6 may be used. This voussoir differs from the voussoir shown in Fig. 3, in that the reduced or thinned end 32 of Fig. 6 may be slightly longer than the corresponding end 8 of Fig. 3, the pivot aperture 33 being spaced from the extremity of the part 32, and the openings 34 which receive the adjusting pins being extended outwardly toward the corner 35 of the thinned end 32.

In Fig. 7 a further modification in the unit or voussoir is shown. In this form of the invention, the arms 36 are provided with two notches 37, located on opposite sides of the pivot apertures 38 which, in this instance, are located intermediate the ends of the arms 36, instead of adjacent the outer ends of the arms as shown at 16 in Fig. 3. The openings 39 which receive the adjusting pins, are in the form of an approximate half circle. In the thinned end 40 of the unit is placed a pivot opening 41, corresponding to the opening 33 of Fig. 6, the openings which receive the adjusting elements being denoted by the numeral 42 and corresponding to the openings 34.

Fig. 8 shows a longitudinally adjustable voussoir or unit. This unit includes a body 43 including walls 44 connected adjacent their inner ends by a web or bottom 45. An extension piece 46 slides between the walls 44 on top of the web 45, the extension piece 46 and the walls 44 being provided with openings 47 through which may be passed securing pins 48 of any desired kind, it being possible by this construction to lengthen and shorten the unit. The extension piece 46 is supplied adjacent one end with a pivot opening 48 and has openings 49 disposed in arcs the centers of which is the opening 48. The walls 44 of the body 43 are provided with notches 50, as above described, the pivot apertures in the walls 44 appear at 51 and the openings which permit an adjustment, being shown at 52.

In Fig. 9 there is shown a voussoir or unit which is of considerably greater length than those hereinbefore described. This unit may be in the form of an I-beam including a body 54 having a pivot aperture 55, and adjusting apertures 56 disposed with respect to the aperture 55, as above described. At one end the body 54 is provided with arms 57. Reinforcing flanges 98 extend along the body 54 and onto the arms 57. Pivot apertures in the arms 57 appear at 58, the notches are shown at 59 and the openings which permit an adjustment are shown at 60.

For light work, a two-part keystone of the kind shown in Figs. 10 and 11 may be used. This keystone includes a pair of plates 62 provided with reinforcing flanges 63 and supplied adjacent their ends and upon their upper edges with notches 64 as before described. The pivot apertures are shown at 66, and the openings which permit an adjustment, are shown at 67. The numeral 68 designates generally a screw, provided with an enlarged portion 69 threaded into one of the plates 62, and terminating in a reduced portion 70 threaded into the other plate. The parts 69 and 70 are threaded in opposite directions to engage the respective plates. On its outer end, the screw 68 may be supplied with a finger piece 71, permitting a rotation of the screw. When the screw 68 is rotated, the plates 62 will be drawn together and will clamp securely such elements as the ends 8 of the voussoirs 6.

Having thus described the invention, what is claimed is:—

1. In a device of the class described, a support comprising a plurality of voussoirs; pivot elements connecting the voussoirs, the voussoirs being provided in their outer edges with notches disposed in arcs the centers of which are pivot elements; a lagging supported on the voussoirs and comprising plates, one end of each plate being curved to fit in the notch of one of the voussoirs, and the other end of each plate overlying the curved portion of an adjoining plate.

2. In a device of the class described, a voussoir comprising walls and a web connecting the walls; an extension piece slidable between the inner ends of the walls on the web; means for securing an adjustable connection between the extension piece and the walls; the walls and the extension piece being provided with pivot openings at their upper outer corners, and the walls and the extension piece being provided with openings disposed in arcs the centers of which are the pivot openings in the extension piece and in the walls respectively.

3. In a device of the class described, a keystone made up of spaced plates, and a screw connecting the plates, the screw being right hand threaded into one plate and being left hand threaded into the other plate.

4. In a device of the class described, a keystone made up of spaced plates, and a screw connecting the plates, the screw being right hand threaded into one plate and being left hand threaded into the other plate, each plate being provided adjacent its upper outer corners with pivot apertures, and being provided with openings disposed in arcs the centers of which are the pivot apertures.

5. A keystone comprising spaced plates and a means for connecting the plates, the plates being provided adjacent their upper outer corners with pivot apertures and being provided in their upper edges with notches located adjacent the pivot apertures, the plates being provided with openings disposed in arcs the centers of which are the pivot apertures.

In testimony that I claim the foregoing as my own, I have hereto affixed my signature in the presence of two witnesses.

HENRY H. FRICK.

Witnesses:
J. L. LESLIE,
J. WALDEN.

Copies of this patent may be obtained for five cents each, by addressing the "Commissioner of Patents, Washington, D. C."